US006590892B1

(12) United States Patent
Lenander et al.

(10) Patent No.: US 6,590,892 B1
(45) Date of Patent: Jul. 8, 2003

(54) ARRANGEMENT, SYSTEM AND METHOD RELATING TO COMMUNICATION

(75) Inventors: Jan Lenander, Askim (SE); Peter Kriens, Onsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/307,587

(22) Filed: May 7, 1999

(30) Foreign Application Priority Data

May 8, 1998 (SE) .............................. 9801602

(51) Int. Cl.[7] ................................ H04J 3/16
(52) U.S. Cl. ...................... 370/352; 370/465
(58) Field of Search .................. 370/252, 466, 370/351, 352, 465, 468, 401, 402, 403, 389, 395.52, 395.5, 395.6; 379/352, 466; 709/223, 224, 220, 206

(56) References Cited

U.S. PATENT DOCUMENTS

| 5,533,116 A | | 7/1996 | Vesterinen | |
|---|---|---|---|---|
| 5,742,762 A | | 4/1998 | Scholl et al. | |
| 5,764,955 A | * | 6/1998 | Doolan | ........................ 709/223 |
| 5,999,179 A | * | 12/1999 | Kekic et al. | ................. 345/734 |

FOREIGN PATENT DOCUMENTS

| EP | 0841831 | 5/1998 |
|---|---|---|
| WO | WO98/18283 | 4/1998 |
| WO | WO98/33302 | 7/1998 |
| WO | WO98/44747 | 10/1998 |

OTHER PUBLICATIONS

ITU–T CCITT Recommendation Z.311, "Man–Machine Language, Introduction to syntax and Dialogue Procedures", International Telecommunication Union Nov. 1988, 1993.

ITU–T CCITT Recommendation Z.312, "Man–Machine Language, Basic Format Layout", International Telecommunication Union Nov. 1988, 1993.

ITU–T CCITT Recommendation Z.314, "Man–Machine Language, The Character Set and Basic Elements", International Telecommunication Union Nov. 1988, 1993.

ITU–T CCITT Recommendation Z.315, "Man–Machine Language, Input (Command)Language Syntax Specification", International Telecommunication Union Nov. 1988, 1993.

ITU–T CCITT Recommendation Z.316, "Man–Machine Language, Output Language Syntax Specification", International Telecommunication Union Nov. 1988, 1993.

ITU–T CCITT Recommendation Z.317, "Man–Machine Language, Man–Machine Dialogue Procedures", International Telecommunication Union Nov. 1988, 1993.

ITU–T CCITT Recommendation Z.341, "Man–Machine Language, Glossary of Terms", International Telecommunication Union Nov. 1988, 1993.

CCITT Recommendation M.3010, "Principles For A Telecommunications Management Network", Oct. 1992.

(List continued on next page.)

Primary Examiner—Dang Ton (57) ABSTRACT

An arrangement, a system and a method provide communication between clients and managed systems via managing systems. The clients communicate with the managing system over a first network using an IP-protocol, and a managing system(s) communicate with a number of managed systems over a second network. Each managing system includes a service management node with an information handling device for separating addressing information from other information of an incoming message and for adapting the information to the communication protocol used for communication with the addressed managed system.

24 Claims, 6 Drawing Sheets

OTHER PUBLICATIONS

"MIME (Multipurpose Internet Mail Extensions) Part One: Mechanisms for Specifiying and Describing the Format of Internet Message Bodies", Network Working Group, N. Borenstein, Bellcore & N. Freed,Innosoft, RFC 1521, Sep. 1993, www.ietf.org/rfc/rfc1521.txt.

"Uniform Resource Locators (URL)", Network Working Group, T.Berners–Lee, CERN and L. Masinter, Xerox Corp., and M. McCahill, U. of Minnesota, Dec. 1994, www.ietf.org/rfc/rfc1738.txt.

"Uniform Resource Identifiers in WWW: A unifying Syntax for the Expression of Names and Addresses of Objects on the Network as used in the World–Wide Web", Network Working Group, T.Berners–Lee, CERN Jun., 1994, www.ietf.org/rfc/rfc1630.txt.

"MIME (Multipurpose Internet Mail Extensions) Part Two: Message Header Extensions for Non–ASCII Text", Network Working Group, K. Moore, U. of Tenn., Sep. 1993, www.ietf.org/rfc/rfc1522.txt.

* cited by examiner

ARRANGEMENT, SYSTEM AND METHOD RELATING TO COMMUNICATION

This application claims priority under 35 U.S.C. §§119 and/or 365 to 9801602-5 filed in Sweden on May 8, 1998; the entire content of which is hereby incorporated by reference.

BACKGROUND

The present invention relates to provision of communication between clients and managed systems via managing systems wherein the managed systems particularly are network elements, even more particularly in the form of telephone exchanges. Particularly the invention relates to an arrangement for providing communication between clients and managed systems via a managing system, and a method and a system in which communication is provided between clients and managed systems.

Many telecommunication systems have an architecture that was developed in the seventies. At that time the constraints and design considerations were different from today, CPU (Central Processor Unit) cycles were expensive and communication between computers was almost non existent. Due to large investments in time as well as money it is infeasible to replace these systems or even to replace the architecture. One example on a structure is the AXE structure developed by Ericsson. This architecture has proved to be very scaleable. Applications in this structure are written as function blocks. The AXE defines a structure for communication between function blocks and the management of the function blocks has been standardized. The management is handled by a command language called Man Machine Language (MML) that is communicated over an X.25 connection. MML Man-Machine Language is a language for telecommunications applications. It has a complex natural-language syntax. It is further described in ITU-T, formally CCITT Recommendations Z.311–Z.318, Z-341, November 1984.

The communication to an AXE is handled with the Message Transfer Protocol (MTP) over X.25. This combination is responsible for transferring a command string to the AXE exchange and returning a direct print-out string or transferring a file.

A management program requires a programmatic interface to the AXE. Many different interfaces have been devised but unfortunately all of these interfaces are dedicated to the AXE (similar for other exchanges) which makes the use of standard applications very difficult since they are not aware of these highly specialized interfaces. Until recently this was not felt as a problem since the management of the AXEs was handled by highly skilled people in dedicated control centers. However, this has now changed, mainly because of two factors. Firstly, the enormous growth of telecommunications in quantity and quality have multiplied the need of management. The huge amount of services available to subscribers today also have be maintained. Secondly, the operators of telecommunications have become more aware of what actually is possible today and do not accept solutions which are not as good as that what is offered on the market. The operators want well designed graphic user interfaces and (possibility of) integration with tools from other vendors. Systems are known which use so called CGI scripts. Through such systems a broad range of possibilities for accessing of resources are offered and they are based on a standard conversion of a HTTP format. However, a sufficiently high performance is not achieved and furthermore the features depend on the platforms. Furthermore such solutions are not satisfactory and they do not provide a total system solution as far as managing a network using several independent management functions is concerned.

In known systems, generally, the specific software has to be built for each database, each table, user information, intelligent software etc. that is operated towards. Thus a specific interface has to be provided for each application which to high extent limits the flexibility.

SUMMARY

What is needed is therefore an arrangement for providing communication between clients and managed systems via a managing system which is flexible and through which a uniform way of communication with the different managed systems is enabled. Furthermore, an arrangement is needed which enables managing of a network using several independent management functions in a uniform way. Further yet an arrangement is needed through which the high performance needs can be satisfied to a higher extent than hitherto and through which a platform independence is provided. Still further an arrangement is needed which does not require specific interfaces for communication with particular managed systems, such as network elements, particularly telephone exchanges such as AXE, PBX etc. Still further an arrangement is needed through which the use of standard applications is facilitated.

A system including a number of clients in which applications are executed and a number of management nodes and a number of managed systems wherein the clients communicate with the management nodes using a first network and the management nodes communicate with the managed systems using a second network is also needed through which the above mentioned objects can be achieved.

Still further a method of providing communication between clients in which applications are executed, and managed systems is needed through which the above mentioned objects are achieved.

Therefore an arrangement for providing communication between clients and managed systems via a managing system is provided wherein the clients communicate with the managing system over a first network using an IP (Internet Protocol). The managing system in turn communicates with a number of managed systems over a second network and the managing system comprises a service management node including information separating and distributing means for separating addressing information from other information of an incoming message from a client and for adapting the information to the communication protocol that is used for communication with the addressed managed system. Particularly an application which contains the major part of the logic is executed on the client and the information used by said application is provided in a Uniform Resource Locator (URL) which is provided to the managing system. Further still, each managed system acts and is experienced as a web server. The managed systems are advantageously network elements which particularly may consist of telecommunication exchanges such as for example AXEs or similar. Alternatively the exchanges may be PBXs (PABXs) (Private Automatic Branch Exchange).

In a particular embodiment the adapting means includes a number of converters for converting an incoming URL to the protocol used for communication with the addressed managed system. Particularly there is one converter for each type of managed system, particularly network element or even more particularly telephone exchange, with which communication is provided via the managing systems.

The management node may in addition thereto contain a number of gateways for communication with the managed systems such as network elements, telephone exchanges, wherein the respective converting means communicate with said gateways over a third protocol such as for example Telnet. According to different embodiments converting means and gateways may be provided in one common entity but they may also be provided separately as referred to above in which case they communicate over a protocol. Particularly the communication with each managed system, for example NE or even more particularly telephone exchange, is provided uniformly irrespectively of which is the type of the managed system (network element, telephone exchange). The clients may be operator controlled but they may also function without an operator and for example be programmed to fetch information at a given frequency, to store said information and to reproduce or represent the information in an appropriate manner to a managed system. Advantageously each client comprises logic or intelligent processing means for deciding to which managed system, e.g. network element, or type of network element, information is to be sent. The managed systems, or particularly the network elements (telephone exchanges), are configured by the use of an MML-language. Particularly the executing functionality in a client contains data which is structured for each type of managed system (c.f. network element, telephone exchange) and the client further contains means for selecting syntax and information intended for the concerned managed system. In the converting means information in URL-format is converted or mapped to MML-format and a gateway may be used for communication with the relevant managed system or network element.

A management node communicating with a number of clients via a first network and managing a number of managed systems over a second network is also provided. The first network is an IP-network using an IP-protocol and URLs are used for communication with the node. The node comprises information separating and distributing means for separating addressing information addressing a managed system from other information and for adapting information to the protocol used for communication with the addressed managed system.

Particularly the management node contains a number of protocol converting means, one for each type of managed system, particularly network element. As referred to above the managed systems advantageously are network elements, particularly telephone exchanges such as AXEs (Ericsson); S12 (Alcatel); EWSD (Siemens) or similar, PBXs etc.

A system is therefore also provided which includes a number of clients in which applications are executed, a number of management nodes and a number of managed systems. The clients communicate with the management nodes using a first network and the management nodes communicate with the respective managed systems using at least one second network. The first network is according to the invention an IP-network using an IP-protocol and the information of the executed application is provided in URLs containing information about the relevant management node and the management nodes include information separation and distributing means for separating addressing information of an addressed managed system and converting means are provided for conversion from the protocol of incoming information, URLs, to the protocol used for communication with the addressed managed system. In each management node there is advantageously one converting means for each type of managed system with which the particular management node communicates. From the URLs can be deduced which specific managed system (type of managed system) that is addressed.

Particularly the managed systems are network elements which may consist of telephone exchanges such as AXE or similar, PBXs etc. whereas the management node is comprised in a managing system, for example in the form of an operation system (OS), cf. TMN, Telecommunications Management Network, ITU-T M.3010, or OSSs (Operation and Support Systems).

A method is therefore also provided for providing communication between clients and managed systems wherein applications are executed in the clients which address particular managed systems (or types thereof). The method comprises the steps of, providing if information of the executing application in an URL, using a first IP-network for providing information of the URL to the relevant managing system managing the addressed managed system, establishing in the managing system which is the addressed managed system, converting information in the form of an URL to the protocol used for communication with the particularly addressed managed system and providing converted information using a second network to the addressed managed system. As referred to above the managed systems may particularly be telephone exchanges. Particularly, in the managing system separate converting means are provided for each type of managed system and on receiving the URL in the managing system, which comprises a management node, the URL is forwarded to the appropriate converting means using the addressing information. Particularly MML is used for communication between the managing system and the managed systems and the converting means convert URL-format to MML-format.

BRIEF DESCRIPTION OF THE DRAWINGS

The invention will in the following be further described in a non-limiting way with reference to the accompanying drawings in which.

DETAILED DESCRIPTION

In a particular embodiment the present invention relates to a system with several clients being operated by many different operators accessing a service management functionality over an IP network, Internet or an intranet, in which service management functionality is used to control the implementation of a service in a network with several network elements. The service management functionality can of course be distributed in a number of different ways and a substantial part of the functionality may of course also be executing on the client. The protocol towards network elements may differ both as far as the content is concerned as well as to the syntax. The network elements are particularly configured with use of some type of machine language, i.e. ASCII based commands and printouts, which commands and responses are communicated using some underlying protocol. The Man Machine Language (MML) can have a very simple construction. The command identifier may consist of a two-character function block name and a three-character command name. Some commands accept parameters. This can be a single keyword but mostly it consists of an attribute name followed by an equal sign and one or more values. Multiple values are separated by an ampersand (&). If the value is a range, then a double ampersand can be used to separate the start and end values. Multiple key values are separated with commas and all commands should end with a semi colon. The same commands can often be used in different forms. Key/value pairs can be optional and some combinations of key value pairs are not allowed. This is more thoroughly described in ITU-T Recommendations Z.311–Z.318, Z.341 as referred to earlier in the present document. According to the present invention Internet (or an intranet) is used. This has advantages for example as compared to the OSI Standard in that the connectivity is ubiquitous, it is practical and efficient and the protocols are easy to use. Furthermore it allows many different implementations for one and the same protocol and the amount of users is in practice unlimited. Due to the development in these areas software development has changed considerably. Traditionally a program contained a large set of functions which belonged to the program. The Internet has made it much cheaper to connect to services, i.e. functions outside the program. This significantly reduces both the complexity and the size of the applications. However, it requires a protocol for communication. This protocol should be as generic as possible since it should be able to utilize an enormous amount of protocols existing on Internet. This need has resulted in a combination of internet standards such as the Uniform Resource Locator (URL) and the Multi purpose Internet Mail Extensions (MIME). Information in an application executing in a client, e.g. one of the clients in FIG. 1, client 1A, 1B, 1C, is put into an URL in such a manner that it is easy to convert this information in a standard way to the commands and printouts and responses of a network element, e.g. NEs 6A, 6B, 6C. It is possible to use the inherent addressing possibilities of the URL to address the right network element using the right protocol.

An URL allows applications to retrieve objects through many different channels from completely different sources by simply specifying a string. The URL mechanism is very flexible and it contains a protocol, e.g. HTTP although others also can be used, a host address with a port and a resource identifier on that host. The identifier may be a simple name, a path name on disk or a query.

Below some examples on valid URLs are given:

http://home1.swipnet.se/~w-16844 http://altavista.com/query?pg=q&what=web&fmt=.&q=url ftp://home.swipnet.se

There are strictly defined rules about URLs such as for example which characters can be used and what rules apply. The HTTP protocol specifies a query format for a URL. The format of this query is:

<query identifier> ? key=value [+key=value . . . ]

When an object is addressed, it is retrieved and enters the receiver system. The receiver either knows the type of the object or does not know the type of the object. In traditional systems the receiver generally knows the type of the object. When someone retrieves a fax from a faxing machine, he expects a fax and not an e-mail. When a computer program reads a mail from a Simple Mail Transfer Protocol (SMTP) server, it expects the familiar format and not a binary gif file. All this, however, requires that the sender and the receiver share a common model of the information they exchange. This shared knowledge is always very difficult to maintain. This problem of object typing is handled with MIME. MIME is an internet standard for defining a unique type code. It is for example described in RFC ((Request for Comment) by IETF (Internet Engineering Task Force Standards) 1521 & 1522 MIME (Multipurpose Internet Mail Extensions) Mechanisms for specifying and describing the format of Internet message bodies (www.w3.org). RFC 1630 describes Universal Resource Identifiers in WWW and RFC 1738 refers to Uniform Resource Locators. The unique type code consists of two parts, a class identifier and a specific type. The exact codings are defined by a standard body and companies wanting to use a private MIME type can use that by prefixing their codes with x-.

Some examples on MIME types are for example:

application/postscript text/x-vCalendar video/quicktime model/vrml

A significant amount of software can be reduced in complexity when objects are encoded with MIME. Since the objects now are self typed, it is possible to reuse code that would have to be unique if coupled to the object type. Furthermore the MIME typing scheme allows for a simple extension scheme. Java™ and Netscape allow for example the installation of handlers of certain types. A URL makes the user of a resource virtually independent of the supplier of the resource. Both parties are aware of the URL (and MIME) but none of them is aware of each other. This makes it possible to have completely independent developments on the two parties since such independently developed products still can cooperate to achieve a task. The commercial WWW browser Netscape is written completely independent from the many services that it utilizes nowadays and many services have been created without being aware of the fact that they could be used by Netscape.

It is thus extremely advantageous to access a network element such as for example a telephone exchange, particularly an AXE although of course also other exchanges are possible and also PBXs, over Internet using URLs. If an MML command is specified as an URL with the query syntax, many tools will become available.

If the command:

bgbgp:bg=1me;

is available through an URL:

http://doris.axe.ericsson.se/bgbgp?bg=1me the lines to follow below would be a form defined in HTML for any WWW browser.

```
<PRE>
    <FORM action="http://doris.axe/bgbgp">
        BG <INPUT type="text" name="BG" value="ALL">
        <input type="submit" value="BGBGP">
    </FORM>
</PRE>
```

This form would send the command to the http server on doris.axe.ericsson.se and the server would translate the URL to the MML command, send it to the AXE with the name DORIS and return the resulting printout as a text file. The WWW browser will display this text for the user. However, the URL can also be used from a programming language. A language like Java has extensive support for manipulating URLs.

Figure 1:
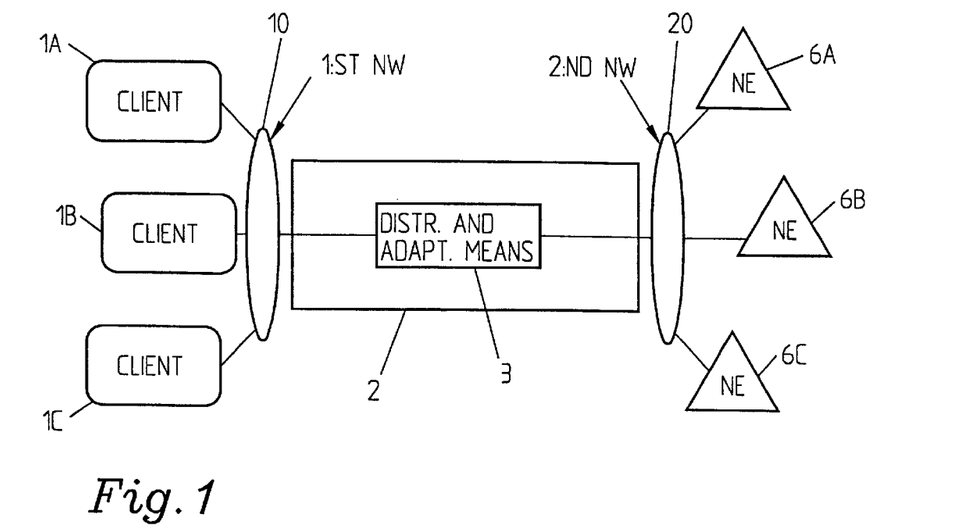
FIG. 1 shows a first implementation of an arrangement according to the invention.
Figure 2:
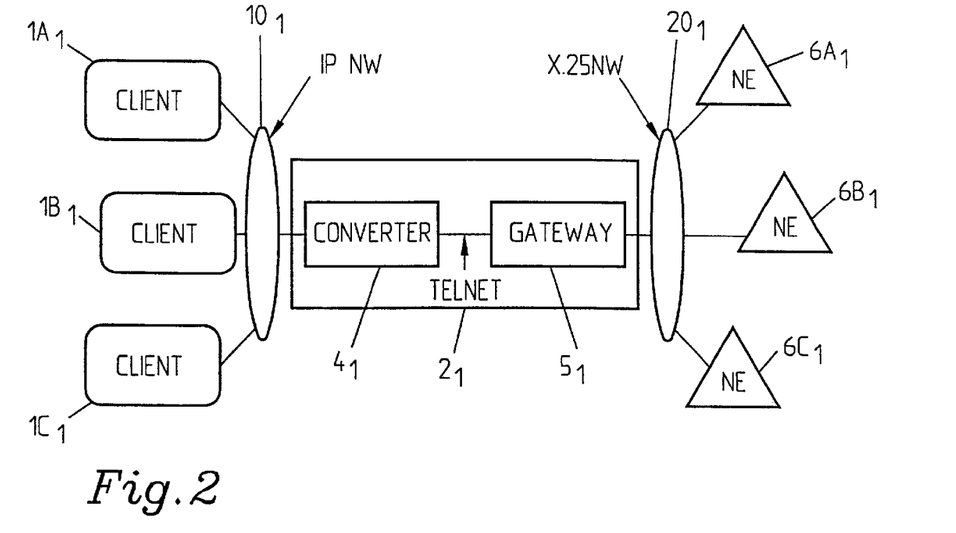
FIG. 2 shows a second implementation of an arrangement according to the invention.

In FIG. 1 clients 1A, 1B, 1C communicate with a managing system, particularly service management node 2 via a first network 10, for example an IP network. The managing system or the service management node 2 communicates with a number of network elements NE 6A, 6B, 6C over a second network 20. In the managing system 2 distributing and adapting means 3 are provided for adapting the information of an incoming message from a client directed to one of the network elements and to distribute the information to the intended network element and to adapt it to the form of the protocol used between the managing system 2 and the respective network element 6A, 6B, 6C. A mapping from an URL to MML is then performed and the network elements can be said to the used as WWW servers. If there is more than one managing system or service management node, the URL contains information so as to direct the information to the correct managing system. In FIG. 2 an alternative embodiment is shown. Also here a number of clients $1A_1$, $1B_1$, $1C_1$ communicate via an IP network $10_1$ with a service management node $2_1$ which in turn communicates via a second networks $20_1$, for example an X.25 network, with a number of network elements $6A_1$, $6B_1$, $6C_1$. The functionality of the service management node $2_1$ is here divided into one converting means 4 and a gateway part $5_1$, between which a communication interface is used, for example Telnet. The network elements $6A_1$, $6B_1$, $6C_1$, may for example, comprise telephone exchanges such as AXEs or similar but also PBXs. In a more generalized form the network elements are managed systems managed by the managing system. Through the invention it is made possible to have a very large amount of the logic or "intelligence" executing in a client and also to make a network element, or even a complete network act as a WWW server with a high performance. Particularly the functionality executing in the client has data structured for each type of network element and the choice of syntax and exact information to convey to a network element is chosen in the client whereas the actual distribution to the right address is performed in the underlying management node $2_1$. The conversion from the URL format to the final format and protocol is done stepwise by first converting the URL specific structure to the final MML sent on a common protocol and then using different gateways $5_1$ communicating with the use of specific protocols for parts of the networks. They can also have a substantial intelligence regarding session transformation. The information for building the Man Machine language strings in the URL is preferably divided into one primary string and a longer information string. The primary string is preferably five characters long and constructed according to specific criteria whereby it also can be used as a basis for checking on allowed operations in a distributed manner. Particularly the primary string may be constructed according to specific criteria making it useable as an addressing means as well.

Figure 3A:
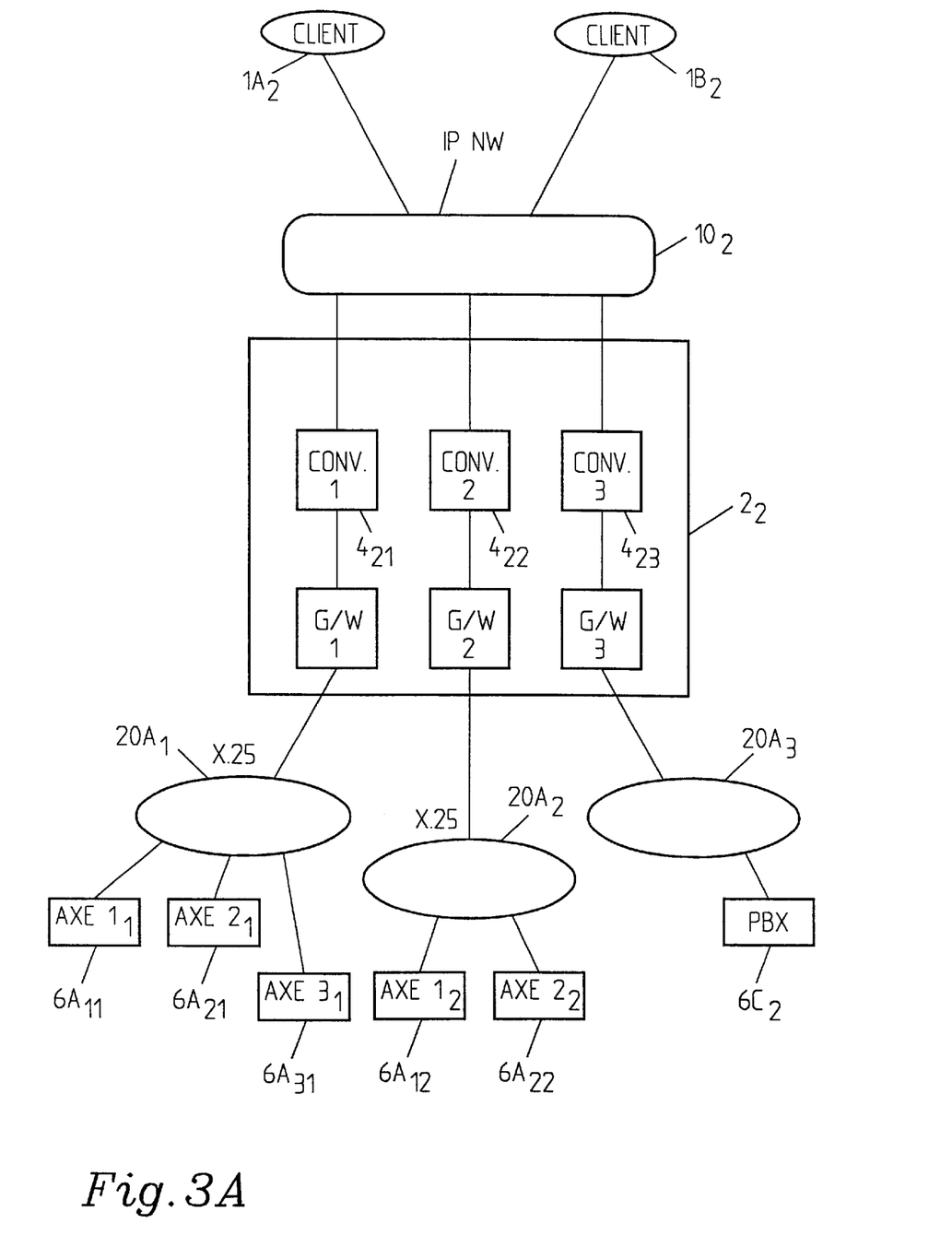
FIG. 3A shows a third implementation of an arrangement according to the invention.

In FIG. 3A still another embodiment is illustrated in which two clients $1A_2$, $1B_2$, communicate with a service management node $2_2$ via an IP network $10_2$. The service management node $2_2$ in turn communicates via X.25 networks $20A_1$, $20A_2$ and via another network $20A_3$ with a number of network elements, in this case telephone exchanges, over second networks $20A_1$, $20A_2$, $20A_3$. In this case networks $20A_1$ and $20A_2$ are X.25 networks. Through the inherent addressing mechanism of the IP-network incoming URLs are sent to the appropriate converting means for the particular type of network element that is addressed. Thus in this case, there are three types of network elements, therefore there are three different converting means CONV1 $4_{21}$, CONV2 $4_{22}$, CONV3 $4_{23}$, one for each type of network element managed by the service management node $2_2$. With each converting means $4_{21}$, $4_{22}$, $4_{23}$ one gateway G/W1, G/W2 and G/W3 respectively is associated. G/W1 communicates via second network $20A_1$ with $AXE1_1$ $6A_{11}$, $AXE2_1$ $6A_{21}$, and $AXE3_1$ $6A_{31}$, wherein index 1 in this case indicate that they are of the same type G/W2 communicates with $AXE1_2$ $6_{12}$ and $AXE2_2$ $6B_{22}$ which also are of one and the same type whereas G/W3 communicates via another network with network element PBX $6C_2$.

Figure 3B:
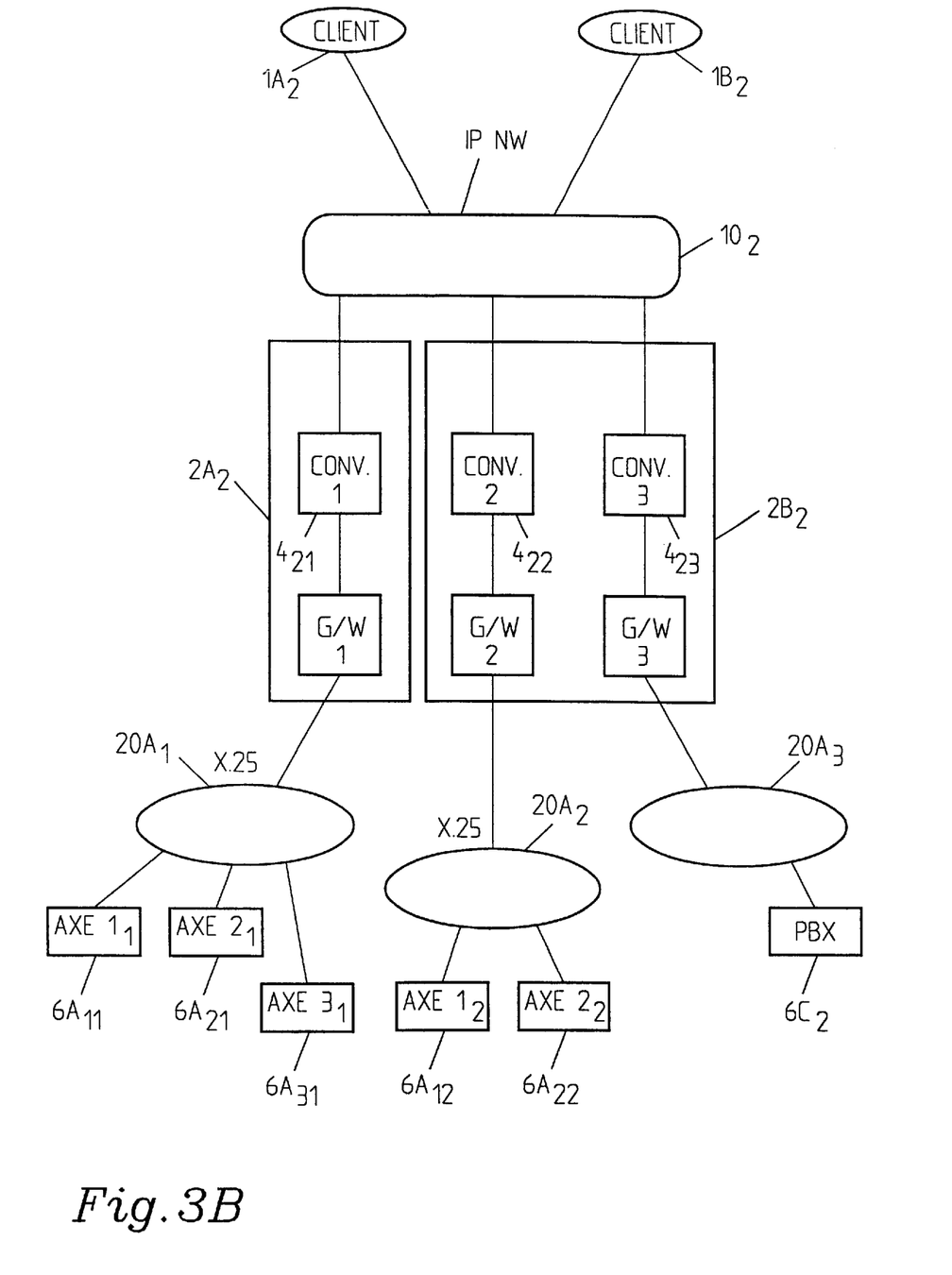
FIG. 3B shows an alternative to the implementation of FIG. 3A.
Figure 3C:
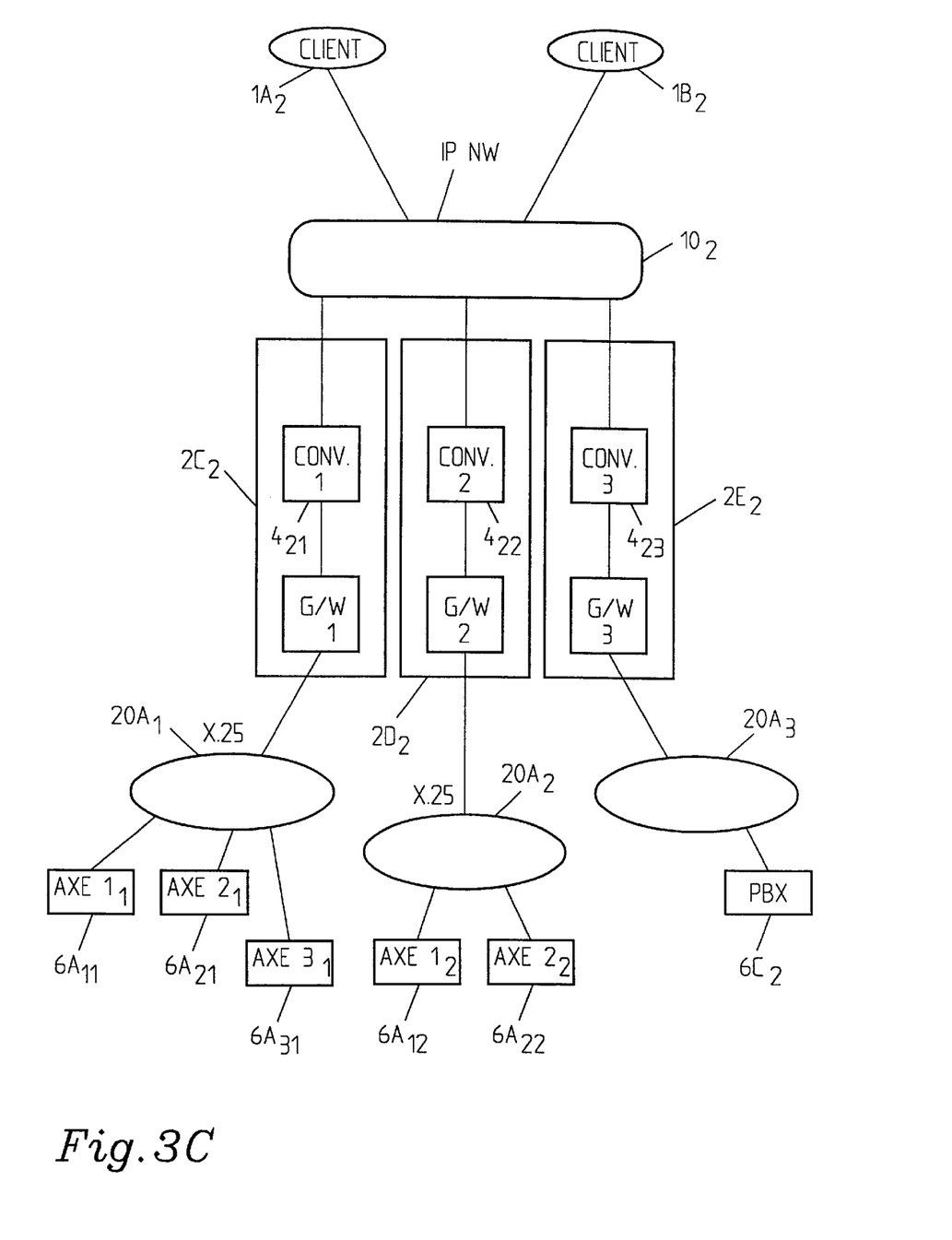
FIG. 3C shows another alternative to the implementation or FIG. 3A, FIG. 4 schematically illustrates the provision of an URL to an OSS, FIG. 5 schematically illustrates an over embodiment in which an URL is provided to a managing system.

Of course there may also be more than one service management node. This is illustrated in FIGS. 3B, 3C. The URL is then also used to find the appropriate service management node.

FIG. 3E shows an embodiment similar to that of FIG. 3A, but in this case there are two service management nodes $2A_2$, $2B_2$. The service management nodes generally have different physical or geografical locations, they may e.g. be located in different towns.

Here node $2A_2$ contains converting means CONV1 and gateway G/W1 for communication with network elements $6A_{11}$, $6A_{21}$, $6A_{31}$. (The reference numerals are the same as those of FIG. 3A, merely for reasons of simplicity, it should however be clear that the configurations can be very different. The other node $2B_2$ contains CONV2, CONV3 which via G/W2, G/W3 communicate with network elements $6A_{12}$, $6A_{22}$ and $6C_2$ respectively.

FIG. 3C shows still another embodiment with three nodes $2C_2$, $2D_2$, $2E_2$ which may be provided on different geografical locations although they also may be coallocated. Here each node contains but one converter and one gateway and each node communicates with a number of network elements via a network. Of course a number of clients, nodes and network elements as well as the arrangement in different nodes, the kinds of network elements are not limited to the shown embodiments but can be very different.

Of course also any number of types of network elements is possible and it is also possible to use the same network but different protocols for communication with a particular type of network element. The telephone exchanges do furthermore of course not have to be AXEs and PBXs (such as e.g. MD110 of Ericsson) but it may be any kind and any combination of telephone exchanges. It should however be clear that the invention is not limited to telephone exchange (here relating to public as well as private exchanges) but it applies just as well to other kinds of managed systems, e.g. network elements managed by a managing system receiving applications executed in a client.

Figure 4:
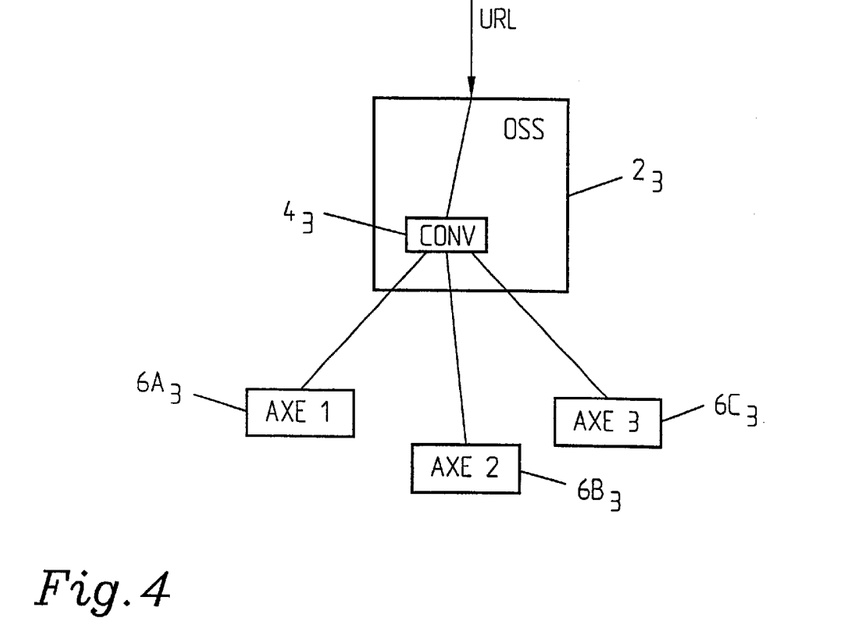

FIG. 4 schematically illustrates an URL incoming to a managing system $2_3$ in the form of an OSS (Operation Support System) $2_3$ comprising one converting means $4_3$ since in this case there is just one type of network elements, namely AXE1 $6A_3$, AXE2 $6B_3$, AXE3 $6C_3$.

Figure 5:
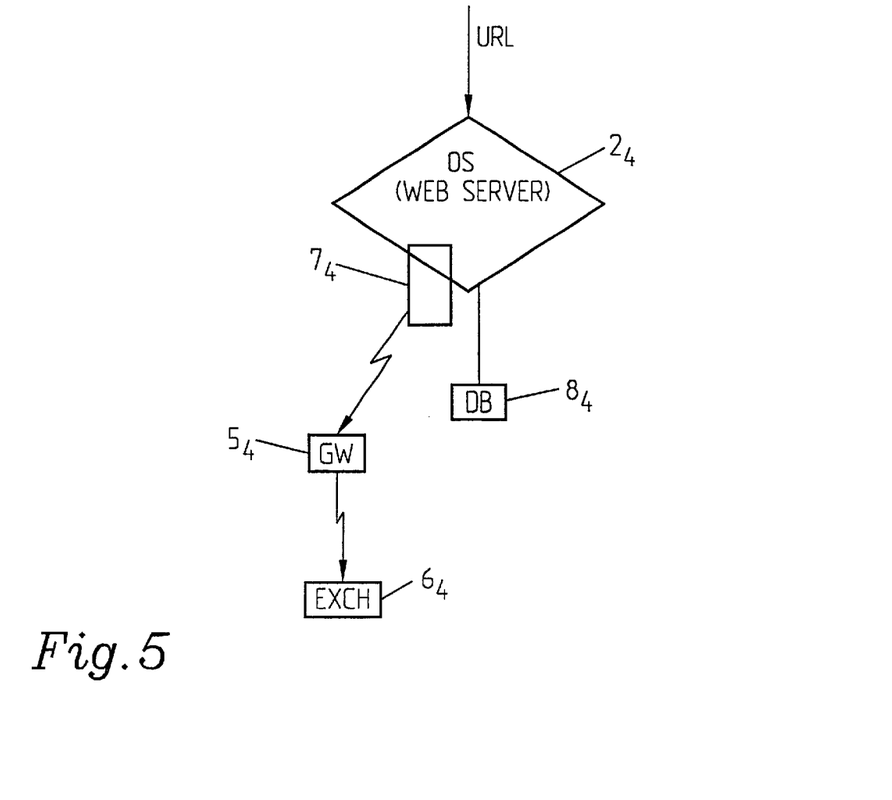

In a similar manner an implementation is illustrated in FIG. 5. An URL is incoming to a managing system, here in the form of an operation system OS $2_4$ acting as a web server in which a servlet $7_4$ is linked in for providing communication with a gateway $5_4$ in turn communicating with a telephone exchange $6_4$. The OS $2_4$ also supports access to databases DB $8_4$ and similar, for example using CGI.

Figure 6:
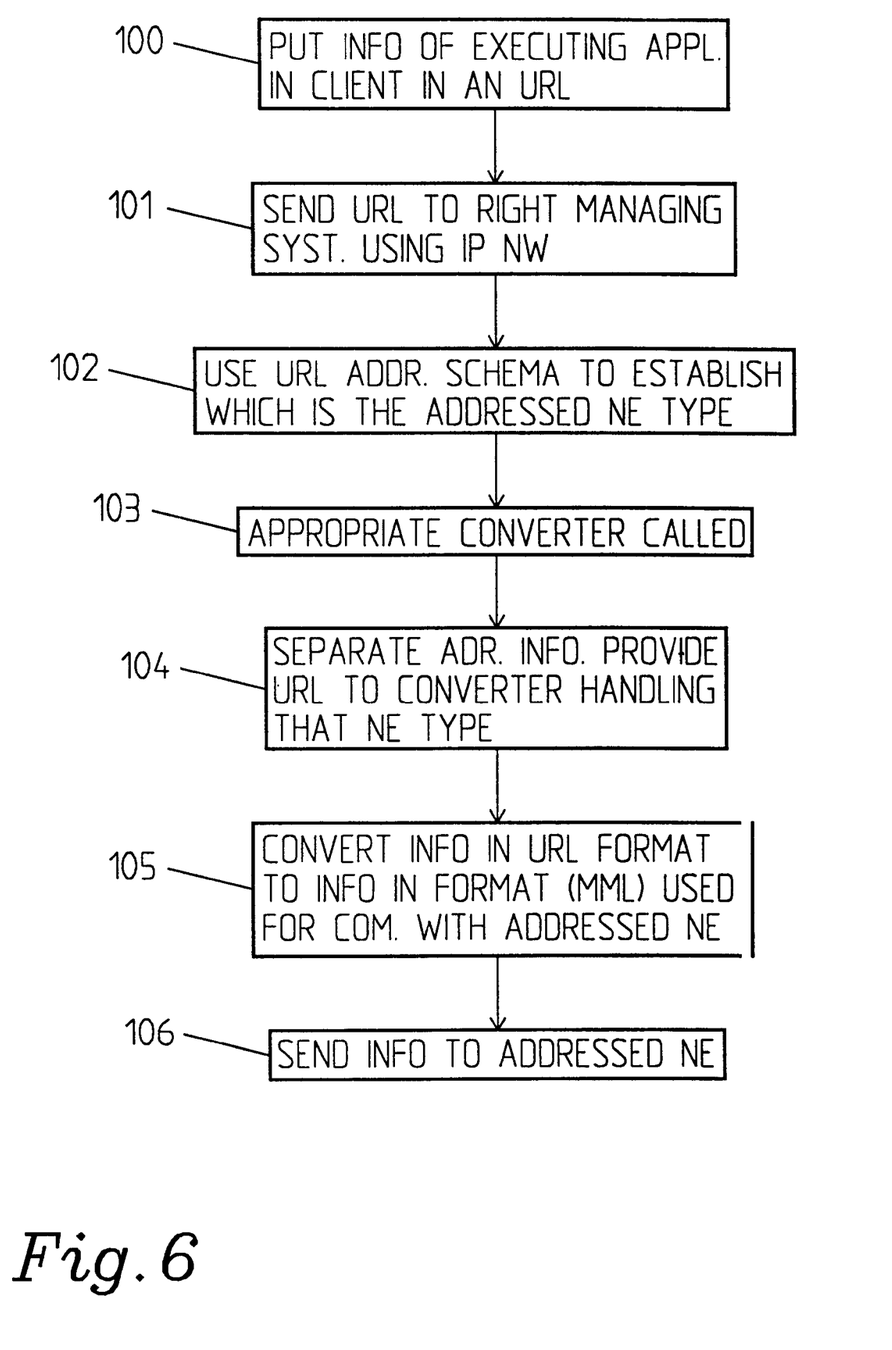
FIG. 6 is a schematical flow diagram.

FIG. 6 is a schematical flow diagram grasping the essential parts of the inventive concept. First information of an application executing in a client is put in an URL, 100. The URL is then (using the inherent addressing properties of the URL) provided to the appropriate managing system using a first network, using an IP protocol, 101. When the URL is received in the managing system, particularly a service management node, the URL addressing functionality, or addressing scheme is used to establish which is the type of the addressed network element NE, 102. The appropriate converter is then called, 103, and the addressing information is separated from the rest of the information and the URL is provided to the appropriate converting means handling the addressed NE type, 104. In the converting means the information in an URL-format is converted to an MML-format or more generally the protocol used for communication with a particular addressed NE, 105. The information is then provided to the addressed NE, 106.

It should be clear that the invention is of course not limited to the particularly illustrated embodiments but that it can be varied in a number of ways within the scope of the appended claims.

What is claimed is:

1. Arrangement for providing communication between clients and managed systems via a managing system, wherein the clients communicate with the managing system over a first network using an IP-protocol, the managing system communicates with a number of managed systems over a second network and the managing system comprises a service management node comprising information separating and distributing means for separating addressing information from other information of an incoming message and means for adapting incoming information to the communication protocol used for communication with the addressed managed system, wherein the adapting means comprises a number of converters, the management node(s) comprise a number of gateways for communication with the managed systems, the converters communicating with the gateways over a third protocol, and the client functions without an operator, and it is programmed to fetch information at a given frequency, to store said information and to reproduce information.

2. Arrangement according to claim 1, wherein a substantial part of the logic is in an application that is executed on the client, and the information used by said application is provided in a Uniform Resource Locator which is provided to the managing system.

3. Arrangement according to claim 1, wherein each managed system acts as, and is experienced as, a web server.

4. Arrangement according to claim 1, wherein the managed systems are network elements.

5. Arrangement according to claim 4, wherein the network elements comprise telecommunication exchanges.

6. Arrangement according to claim 5, wherein at least one of the network elements is a PBX.

7. Arrangement according to claim 1, wherein the management node contains a number of gateways means, and the converting means and the corresponding gateway means, respectively, are combined in a common entity.

8. Arrangement according to claim 1, wherein there are a number of different types of managed systems, there being one adapting means comprising converting means for each type of managed system or network element in the management node.

9. Arrangement according to claim 1, wherein communication with each managed system is provided uniformly, irrespectively of the type of the managed system.

10. Arrangement according to claim 1, wherein the client is operator controlled.

11. Arrangement according to claim 1, wherein each client comprises processing means containing logic for deciding to which managed system information is to be sent.

12. Arrangement according to claim 1, wherein the managed systems are configured by use of MML-language.

13. Arrangement according to claim 1, wherein the executing functionality in a client contains data structured for each type of a number of types of managed systems, and the client further contains means for selecting syntax and information intended for the managed system.

14. Arrangement according to claim 2, wherein in the converting means, information in URL-format is converted to MML-format, and a gateway is used for communication with the relevant managed system.

15. A management node communicating with a number of clients via a first network, the management node managing a number of managed systems over a second network, wherein the first network is an IP-network using an IP-protocol, URLs being used for communication with the management node, and the management node comprises information handling means for separating addressing information addressing a managed system from other information and means for adapting incoming information to the protocol used for communication with the addressed managed system, wherein the adapting means comprises a number of converters, the management node(s) comprise a number of gateways for communication with the managed systems, the converters communicating with the gateways over a third protocol, and the client functions without an operator, and it is programmed to fetch information at a given frequency, to store said information and to reproduce information.

16. A management node communicating with a number of clients via a first network, the management node managing a number of managed systems over a second network, wherein the first network is an IP-network using an IP-protocol, URLs being used for communication with the management node, and the management node comprises information handling means for separating addressing information addressing a managed system from other information and means for adapting incoming information to the protocol used for communication with the addressed managed system, wherein the adapting means comprises a number of converters, the management node(s) comprise a number of gateways for communication with the managed systems, the converters communicating with the gateways over a third protocol, and the client functions without an operator, and it is programmed to fetch information at a given frequency, to store said information and to reproduce information.

17. A management node according to claim 15, the managed systems are network elements.

18. A system including a number of clients in which applications are executed, a number of management nodes and a number of managed systems, wherein the clients communicate with the management nodes using a first network, the management nodes communicate with the managed systems using a second network, and the first network is an IP-network using an IP-protocol, the information of the executed applications being provided in URLs containing information about the relevant management node and the management nodes include information separating and distributing means for separating addressing information of an addressed managed system, and converting means being provided for conversion from the protocol of incoming information to the protocol used for communication with the addressed managed system, wherein the converting means comprises a number of converters, the management nodes comprise a number of gateways for communication with the managed systems, the converters communicating with the gateways over a third protocol, and the clients function without an operator and are programmed to fetch information at a given frequency, to store said information and to reproduce information.

19. A system according to claim 18, wherein there is one converting means for each type of managed system with which a particular management node communicates.

20. A system according to claim 18, wherein the managed systems are network elements, particularly telephone exchanges, such as AXE or similar, PBX etc.

21. Method of providing communication between clients and managed systems, in which clients applications are executed, comprising the steps of:

provviding information of the executing application in an URL, using a first IP-network for providing information of URL to the relevant managing system managing the addressed managed system, establishing in the managing system the type of the addressed managed system, converting information, by one or more converters, in the form of URL to the protocol used for communication with the addressed managed system, and providing the converted information using a second network to the addressed managed system, via a number of gateways for communication with the managed system, wherein the converters communicate with the gateways over a third protocol, the client functions without an operator, and it is programmed to fetch information at a given frequency, to store said information and to reproduce information.

22. Method according to claim 21, wherein the managed systems are network elements.

23. Method according to claim 21, wherein in the managing system, separate converting means are provided for each type of managed system.

24. Method according to claim 21, wherein a MML is used for communication between the managing system and the managed systems, and in the converting means, URL format is converted to MML format.

* * * * *